Feb. 8, 1938. F. M. STADER 2,107,913
FASTENING DEVICE
Filed April 6, 1936
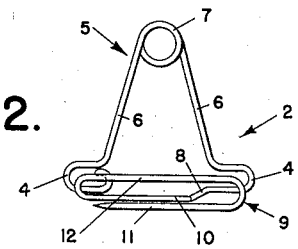
FIG.2.
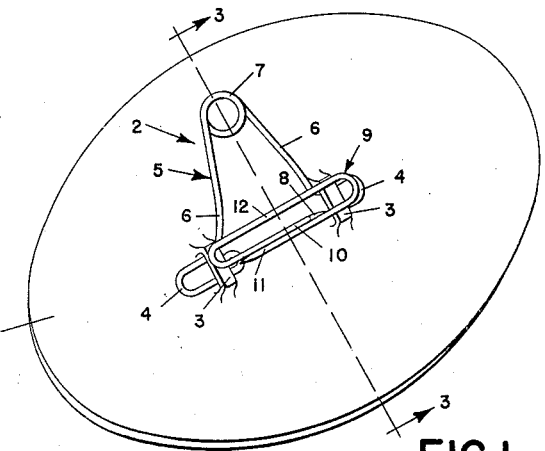
FIG.1.
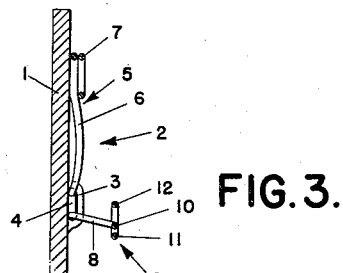
FIG.3.
FIG.5.
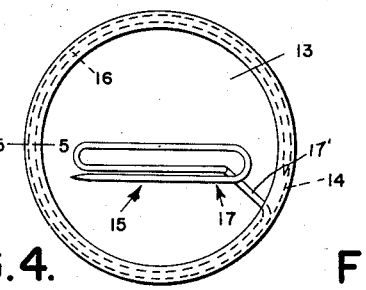
FIG.4.
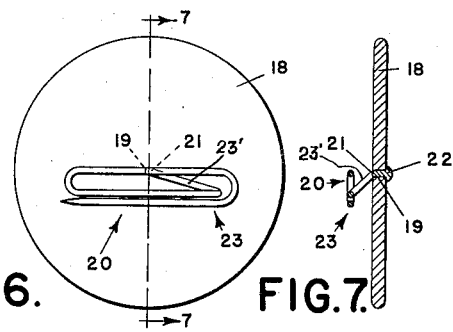
FIG.6. FIG.7.
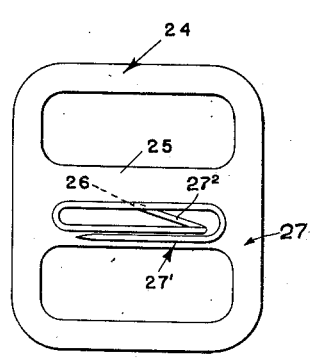
FIG.8.
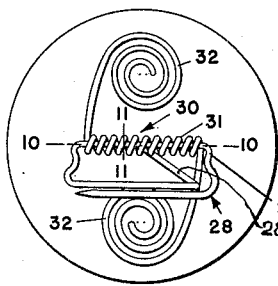
FIG.9.
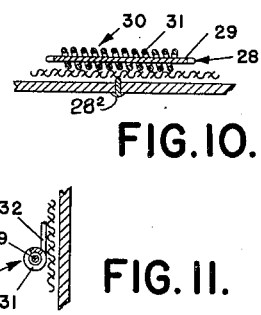
FIG.10.
FIG.11.
INVENTOR
FLORENCE M. STADER
BY
ATTORNEYS Patented Feb. 8, 1938

2,107,913

UNITED STATES PATENT OFFICE 2,107,913

FASTENING DEVICE

Florence M. Stader, Plymouth, Mich.

Application April 6, 1936, Serial No. 72,996

10 Claims. (Cl. 24—103)

The invention relates to fastening devices especially for wearing apparel.

The invention has for one of its objects to provide an improved fastening device comprising a fastening element, such as a button, buckle, and the like, and a fastener having a portion for attachment to the fastening element and a portion for attachment to an article, such as a garment, belt, and the like, the construction being such that the fastening element and fastener may be readily applied or removed. The invention has for another object to so form the fastening device that the fastener may be readily attached to the fastening element. The invention has for a further object to form the fastener of a continuous length of wire and in a manner such that the fastener may be economically manufactured.

These and other objects of the invention will become apparent from the following description, taken in connection with the accompanying drawing, in which Figure 1 is a perspective view of a fastening device showing an embodiment of my invention;

Figure 2 is a plan view of the fastener thereof;

Figure 3 is a cross section on the line 3—3 of Figure 1;

Figure 4 is a plan view showing another modification;

Figure 5 is a cross section on the line 5—5 of Figure 4;

Figure 6 is a plan view illustrating another modification;

Figure 7 is a cross section on the line 7—7 of Figure 6;

Figures 8 and 9 are plan views illustrating other modifications;

Figures 10 and 11 are cross sections on the lines 10—10 and 11—11 respectively of Figure 9 and showing the fastening device applied to an article.

In general, the fastening device comprises a fastening element, such as a button, buckle, and the like, and a fastener having a portion for attachment to the fastening element and a portion for attachment to an article, such as a garment, belt, and the like. The fastening device is particularly applicable to wearing apparel and it is constructed so that it may be readily removed while the wearing apparel is being laundered and then readily replaced. It is also apparent that the fastening device may be used to replace fastening elements which have become damaged or broken.

In the modification illustrated in Figures 1, 2 and 3, the fastening device comprises the button 1 and the fastener 2. The button is provided at one side with the pair of attachment members 3 spaced from each other and forming openings. These attachment members may be formed integrally with the button or may be formed separately and suitably secured to the button. The fastener is formed of a continuous length of wire and has the U-shaped portions 4 which extend laterally and away from each other and the intermediate resilient portion 5 connecting the U-shaped portions. The U-shaped portions are insertable into the attachment members 3 from a position therebetween and the intermediate resilient portion urges these U-shaped portions away from each other and holds the same in the attachment members. However, the U-shaped portions may be readily removed, if desired, by flexing the intermediate resilient portion. For the purpose of maintaining the attachment portion of the fastener firmly against the side of the button, the arms 6 of the intermediate resilient portion are made convex so that when the fastener is attached to the button these arms have been straightened to some extent and are under compression, thereby holding the U-shaped portions 4 and the loop 7 of the intermediate resilient portion firmly against the side of the button.

The fastener also has extending from one of its U-shaped portions and transversely thereof the portion 8 which connects into the elongated loop 9. This loop is spaced from and extending substantially parallel to the side of the button having the attachment members. The loop is provided with the portions 10 and 11 contiguous and substantially parallel to each other and extending in the same general direction, the portion 11 terminating in a pointed end. The loop is also provided with the portion 12 which is spaced from and extends in the same general direction as the portions 10 and 11. The portion 12 is preferably located to extend over the center of the button. The construction of the loop is such that the portion 11 may be passed through the article, such as a garment or a belt, or the like, and the fastener swung to engage the portion 12 with the article. The width of the part of the article engaged by the portion 12 is preferably greater than the width of the loop 9 to thereby effectively secure the fastener to the article.

In the modification illustrated in Figures 4 and 5, the fastening element 13 is formed with the annular inwardly facing peripheral channel 14 and the fastener 15 is formed with the annular portion 16 for engaging the channel, this annular portion normally having a diameter greater than the diameter of the channel so that it is resiliently held therein. The loop 17 of this fastener is formed in the same manner as the loop 9, above described. The loop is also connected to the annular portion by the portion 17' which extends transversely of the fastening element.

In the modification illustrated in Figures 6 and 7, the fastening element is a button 18 having the central or axial hole 19. The fastener 20 is formed with the portion 21 which is adapted to extend through the hole 19 and which is provided with the head 22 for engaging the exposed side of the button. The loop 23 of this fastener is formed in the same manner as the loop 9 and is connected to the portion 21 by the portion 23' which extends transversely of the fastening element.

Figure 8 illustrates the fastening element as a buckle 24 having the bar 25 intermediate its ends. This bar has the central hole 26. The fastener 27 is formed in the same manner as the fastener 20 and is adapted to be secured to the buckle by a headed portion. More particularly, the fastener has the loop 27' which is connected to the headed portion by the portion 27² extending transversely of the buckle.

Figures 9, 10 and 11 illustrate another modification which differs in one respect by forming the spaced loop portion 28 with the intermediate offset part 29. This part is adapted to normally engage the article when the fastening device has been fully applied and by reason of its being offset shoulders are formed in effect at its ends to more securely hold this part in engagement with the article. The loop portion is connected to the portion 28' which extends transversely of the fastening element and is connected to the headed portion 28² for securing the fastener to the fastening element. For the purpose of reinforcing the article, I have, as shown particularly in Figures 10 and 11, provided the flexible reinforcing element 30 at the side of the article opposite the fastening element. After the pointed end of the fastener has been passed through the article, it is passed through the reinforcing element and the fastening device is turned to bring the reinforcing element to a position encircling the part 29. In the present instance, the reinforcing element is a coil spring, but it is apparent that other reinforcing elements, such as flexible disks, might be used. The coil spring preferably has the convolutions 31 which encircle the part 29 and the integral end portions 32 which are arranged in the same plane as the portions of the convolutions engageable with the article. These end portions are curved, as shown, to provide an extended engagement with the article. It is also intended that the reinforcing element may be used with any of the modifications above described.

What I claim as my invention is:

1. The combination with a fastening element having spaced attachment members at one side thereof, of a fastener formed of a continuous length of wire having U-shaped portions insertable into and extending within said attachment members and an intermediate resilient portion for urging said U-shaped portions away from each other and for holding the same in said attachment members, and a portion for attachment to an article.

2. The combination with a button having spaced attachment members at one side thereof, of a fastener formed of a continuous length of wire having U-shaped portions insertable into and extending within said attachment members from a position therebetween, an intermediate resilient portion for urging said U-shaped portions away from each other and for holding the same in said attachment members and a loop provided with portions with one contiguous and substantially parallel to the other and extending in the same general direction, one of said last mentioned portions terminating in a pointed end.

3. The combination with a fastening element, of a fastener formed of a continuous length of wire having a headed securing portion extending through said fastening element and a loop substantially parallel to and spaced from a side of said fastening element and provided with portions with one contiguous and substantially parallel to the other and extending in the same general direction, one of said last mentioned portions terminating in a pointed end.

4. The combination with a buckle having an intermediate bar provided with a hole therethrough, of a fastener formed of a continuous length of wire having a headed securing portion extending through said hole and a loop substantially parallel to and spaced from a side of said fastening element and provided with portions with one contiguous and substantially parallel to the other and extending in the same general direction, one of said last mentioned portions terminating in a pointed end.

5. The combination with a fastening element having spaced attachment members at one side thereof, of a fastener formed of a continuous length of wire having U-shaped portions insertable into and extending within said attachment members and an intermediate resilient portion for urging said U-shaped portions toward said attachment members and for holding said U-shaped portions in engagement with said attachment members, and a portion for attachment to an article.

6. A fastener for securing a button or the like to an article, said fastener being formed of a continuous length of wire and having a portion for attachment to the button or the like and a loop integral with said portion extending substantially parallel to and spaced from a side of the button or the like, said loop being provided with portions extending in the same general direction, one of said last mentioned portions contiguous and substantially parallel to the other of said last mentioned portions and also one of said last mentioned portions terminating in a pointed end.

7. A fastener for securing a button or the like having a channel at one side thereof to an article, said fastener having a securing portion engaging the channel and a loop connected to said securing portion and extending substantially parallel to and spaced from a side of the button or the like, said loop being provided with portions extending in the same general direction, one of said loop portions continuous and substantially parallel to the other and also one of said loop portions terminating in a pointed end.

8. A fastener for securing a button or the like to an article, said fastener having a portion for attachment to the button or the like and a loop connected to said attachment portion and extending substantially parallel to and spaced from a side of the button or the like, said loop being provided with portions extending in the same general direction, one of said last mentioned portions contiguous and substantially parallel to the other of said last mentioned portions and also one of said last mentioned portions terminating in a pointed end, said loop being also provided with a portion spaced from and extending in the same general direction as one of said last mentioned portions, said spaced portion having an offset part.

9. A fastener for securing a button or the like to an article, said fastener comprising a portion for attachment to the button or the like and a loop integral with said attachment portion and extending substantially parallel to and spaced from a side of the button or the like, said loop being provided with portions extending in the same general direction, one of said loop portions contiguous and substantially parallel to the other and also one of said loop portions terminating in a pointed end, said loop being also provided with a portion spaced from and extending in the same general direction as one of said loop portions and a reinforcing element engaged by said spaced portion.

10. A fastener for securing a button or the like to an article, said fastener comprising a portion for attachment to the button or the like, a portion connected to said first mentioned portion and extending transversely of a side of the button or the like, and a loop upon said last mentioned portion and extending substantially parallel to and spaced from said side and provided with portions extending in the same general direction, one of said loop portions contiguous and substantially parallel to the other and also one of said loop portions terminating in a pointed end.

FLORENCE M. STADER.